United States Patent [19]
Thornton

[11] Patent Number: 5,324,989
[45] Date of Patent: Jun. 28, 1994

[54] POWER CONTROLLER MODULE PROVIDING USER SELECTABLE OVERLOAD PROTECTION

[76] Inventor: Roger D. Thornton, R.R. 6, Box 179AB, Wapakoneta, Ohio 45895

[21] Appl. No.: 992,941

[22] Filed: Dec. 17, 1992

[51] Int. Cl.5 .......................... H02J 4/00; H02H 7/00; G06F 15/56
[52] U.S. Cl. ...................... 307/35; 307/31; 307/32; 307/38; 361/93; 364/492
[58] Field of Search ............... 361/18, 93; 307/35, 307/31, 32, 38, 39, 52; 323/268, 269, 350, 908; 364/492, 483

[56] References Cited

U.S. PATENT DOCUMENTS

| | | | |
|---|---|---|---|
| 3,751,676 | 8/1973 | Igarashi et al. | 307/31 |
| 4,194,147 | 3/1980 | Payne et al. | 323/284 |
| 4,349,879 | 9/1982 | Peddie et al. | 364/492 |
| 4,471,232 | 9/1984 | Peddie et al. | 307/35 |
| 4,514,619 | 4/1985 | Kugelman | 364/483 X |

Primary Examiner—Steven L. Stephan
Assistant Examiner—Y. Jessica Han
Attorney, Agent, or Firm—McAndrews, Held & Malloy, Ltd.

[57] ABSTRACT

A remote power controller module for use in power distribution systems having a number of current limiting channels that are capable of being paralleled to provide current pathways from a power source to a load. In one embodiment, the current limiting channels may contain control and monitoring circuitry for monitoring the trip status of all channels and for disabling all paralleled channels in response to the disablement of one channel. The control and monitoring circuitry may also reset the disabled current limiting channels. In another embodiment toggle switches may be used to reset the disabled current limiting channels. The current limiting channels may contain circuitry for monitoring the load across the channel and for tripping current a limit switch within the channel. In one embodiment, the circuitry may monitor current flow through the current limit switch. In another embodiment, the circuitry may monitor the current flow through the switch as well as the voltage drop across the switch.

32 Claims, 9 Drawing Sheets

POWER CONTROLLER MODULE PROVIDING USER SELECTABLE OVERLOAD PROTECTION

TECHNICAL FIELD

The present invention relates to power controller modules for use in power distribution systems, and more particularly, to a remote power controller module using current limiting channels for load protection that are parallelable to provide greater system flexibility.

BACKGROUND OF THE INVENTION

Figure 1:
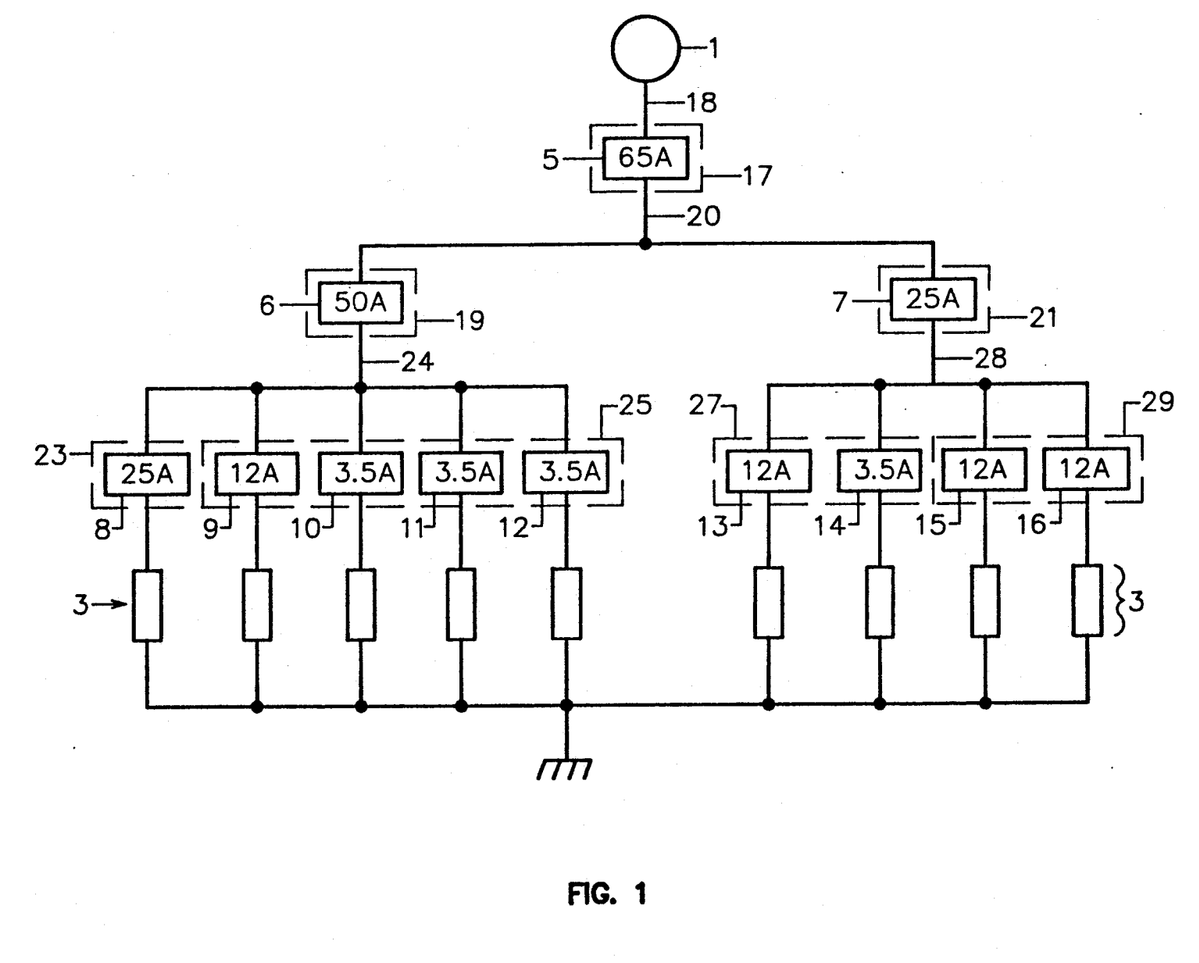
FIG. 1 is a block diagram of a prior art hierarchical power system.

Hierarchical power systems are a standard feature for most aircraft and ground power distribution networks. An example of a typical hierarchical power system found in the prior art is illustrated in FIG. 1. Several levels of power distribution exist between a power source 1 and a variety of loads 3. Remote Power Controllers (RPCs) 5-16 are located at each level of the hierarchical power system. Each of the RPCs 5-16 isolates one or more of the loads 3, monitors current through a power switch (not shown) located within each of the RPCs 5-16, and responds by opening its power switch when a current limit or rating is reached. For example, if there is a fault at one of the loads 3, e.g., a short circuit to ground, any one of the RPCs 5-16 located on current path from the power source 1 to the faulted load may open its power switch, depending on which RPC 5-16 reaches its current limit or rating first. The RPCs at the upper hierarchical levels of a power system have higher current ratings and are generally located near the power source, while RPCs at the lower levels have lower current ratings and are generally located near loads. Current ratings for each of the RPCs 5-16 are given in FIG. 1.

The preferred packaging approach for RPCs is to place combinations of them in a single box, often called an Electrical Load Management Center (ELMC). There may be several of these ELMCs in a typical hierarchical power system. The prior art ELMC packaging approach gives rise to inherent inefficiencies and added system cost because the number of RPCs and their individual ratings are now fixed for a given ELMC design. A system designers' choices are now limited to the available ratings and quantities of RPCs which have been placed in a given ELMC. Further, the RPCs in the prior art ELMCs provide single, as opposed to parallel, current pathways from the source to the load. Standard ELMC designs are available, each having a certain selection of RPCs. For example, a Type 1 ELMC having eight 12 amp RPCs, a Type 2 ELMC having four 25 amp RPCs, a Type 3 ELMC having two 50 amp RPCs, a Type 4 ELMC having one 65 amp RPC, and a Type 5 ELMC having sixteen 3.5 amp RPCs and two 12 amp RPCs were established for the system of FIG. 1.

Specifically, FIG. 1 illustrates a hierarchical power system requiring a Type 4 ELMC, 17, tied at the first hierarchical level to the source 1, via input line 18. The output of ELMC 17 is connected at a second hierarchical level to a Type 3 ELMC, 19, and to a Type 2 ELMC, 21, via line 20. To accommodate the lower level of the power system, i.e. near the loads 3, the output of ELMC 19 is connected to a Type 2 ELMC, 23, and a Type 5 ELMC, 25, via line 24. Further the output of ELMC 21 is connected to a Type 5 ELMC, 27, and a Type 1 ELMC, 29, via line 28. Based on this example prior art system with the RPC ratings and quantities of the ELMC types given above, a total of 7 ELMCs of five different designs were required to complete the system. In addition, the system of FIG. 1 resulted in 43 unused RPCs (not shown) in the required ELMCs. The unused RPCs represent excess cost, weight, and design complexity in the system application.

Furthermore, the prior art ELMC design is not flexible enough to accommodate upgrades and enhancements that invariably occur in hierarchical power systems. System changes have to be made within the limitations of the unused RPCs available in the ELMCs found in the system. When system improvements require changes in load current ratings and/or location of power switches within the system hierarchy, the associated RPCs have to be replaced or additional RPCs added to meet the new system requirements.

SUMMARY OF THE INVENTION

In accordance with the present invention, the disadvantages of the prior art ELMCs, as discussed above, have been overcome. More particularly, a power controller module is disclosed which, when located between a power source and a load in a power distribution system, provides current overload protection for the load. The power controller module contains a number of current limiting channels each having a current limit switch connected between an input line and an output line. The input and output lines are such that any number of the current limiting channels may be connected in parallel to provide various current pathways between the source and the load. The parallel grouping of the current limiting channels provides a more flexible selection of load current limit levels. The current limit switch may be responsive to circuitry in the current limiting channel to enable or disable the current limiting channel. Further, the current limiting channel may contain control and monitoring circuitry to monitor the trip status of the current limiting channels and disable all paralleled channels in response to the disablement of one channel.

These and other objects and advantages of the invention, as well as details of an illustrative embodiment, will be more fully understood from the following description and the drawings.

DESCRIPTION OF THE PREFERRED EMBODIMENTS

Figure 2:
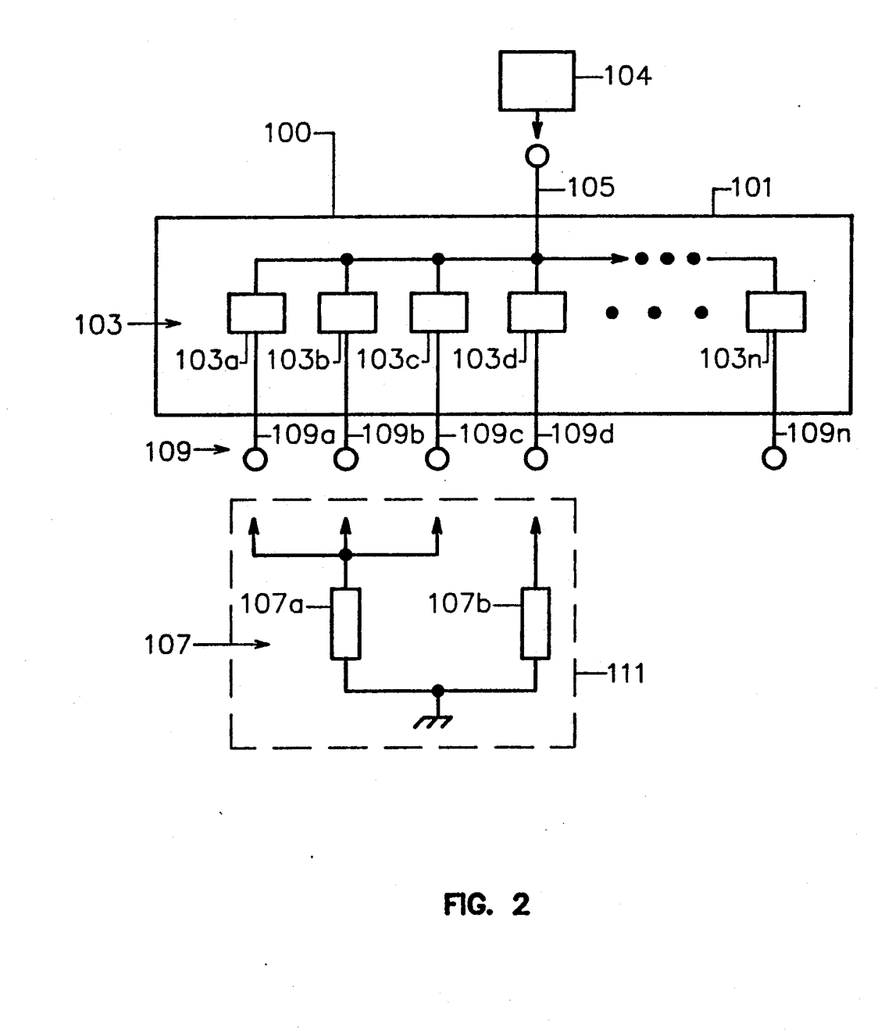
FIG. 2 illustrates an embodiment of the flexible remote power controller module of the present invention.

FIG. 2 illustrates an embodiment of the Flexible Remote Power Controller Module (FRPCM) 100 of the present invention. The FRPCM 100 consists of a housing 101 containing a number of low current power current limiting channels 103, each having a current rating or limit level. Each of the current limiting channels 103 contains its own control and protection circuitry (not shown) including a current limit switch providing current limiting and overload shutdown functions. Additional detail with regard to the current limiting channels 103 will be given below in reference to FIGS. 6 and 7. The current limiting channels 103 may be connected to a power source 104 via input line 105 and to any number of loads 107 via output lines 109. The current limiting channels 103 may be connected in parallel and thus ganged to provide multiple current limit levels. For example, if current limiting switch channels 103a–103c each had a current limit level of 4 amps, and were connected to load 107a via output lines 109a–109c as shown, the parallel combination of the three current limiting channels 103a–103c would provide a 12 amp current limit level for protection of load 107a. Thus, if the current limiting channels 103 all had the same current limit level, they could be combined to provide any multiple of the single channel level. The number of current limiting channels 103 and the current limit level for each may be selected to fit power system design requirements. While FIG. 2 shows a single input/multiple output configuration, a multiple input/multiple output configuration may also be used.

Figure 3:
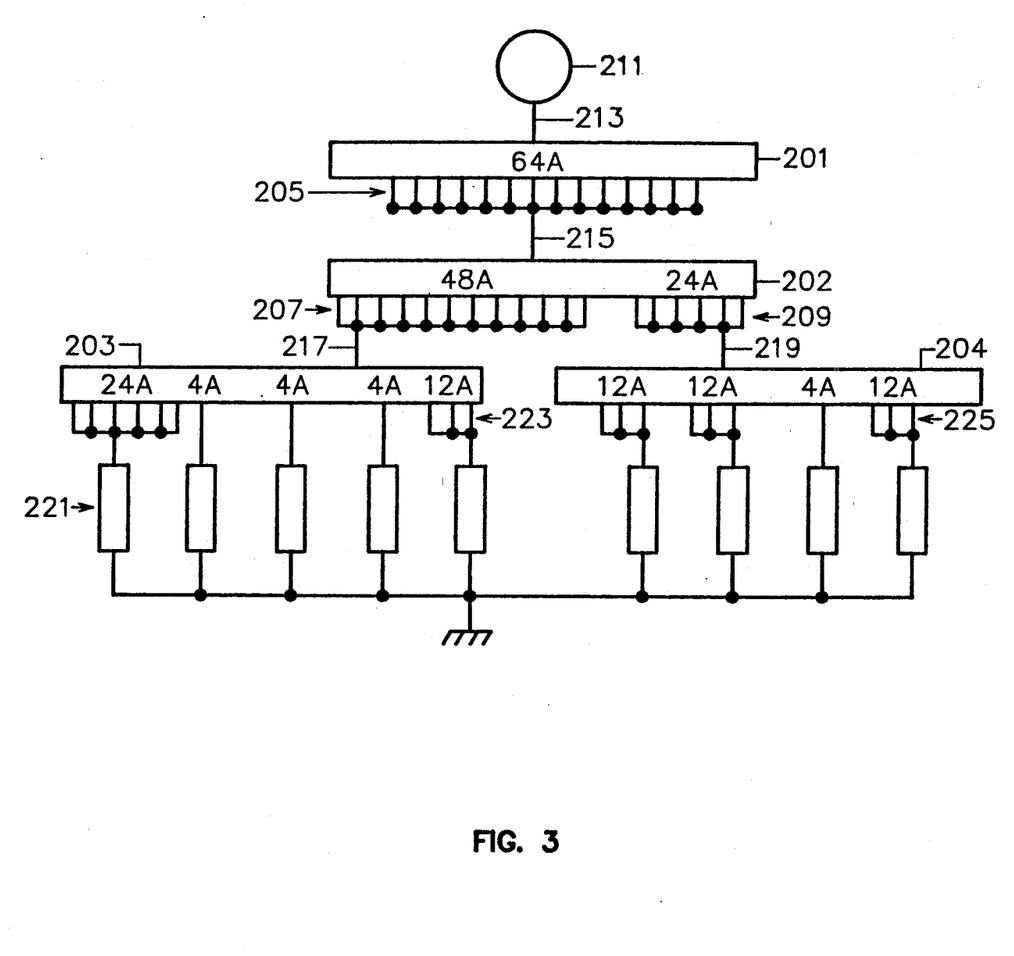
FIG. 3 illustrate the use of the flexible remote power controller module of the present invention to build the hierarchical power system of FIG. 1.

FIG. 3 illustrates the use of the FRPCM of the present invention to solve the problems discussed above relating to the prior art ELMCs found in the hierarchical power system of FIG. 1. The FRPCMs 201–204 may contain, for example, 24 current limiting channels (not shown), each having a current limit level of 4 amps. Sixteen of the current limiting channels in FRCPM 201 are paralleled via lines 205 to achieve the total current limit level of 64A required at the upper level of the hierarchical system. Similarly, at the next lower hierarchical level, twelve of the current limiting channels are connected in parallel via lines 207 to achieve the 48 amp current limit level and six of the current limiting channels are paralleled via lines 209 to achieve the 24 amp current limit level. Similar paralleling of current limiting channels in FRPCMs 203 and 204 is done to achieve the current limit levels as shown at the lowest level of the hierarchical system. While FIG. 3 shows the paralleling of the current limiting channels being performed externally to the FRPCMs 201–204 via hard wiring at the output, it can also be performed externally at the inputs or via internal hard wiring as discussed below in reference to FIG. 4. A power source 211 is connected to FRPCM 201 via input line 213. The lines 205 of FRPCM 201 are connected to FRPCM 202 via line 215. Similarly, lines 207 of FRPCM 202 are connected to FRPCM 203 via line 217 and lines 209 of FRPCM 202 are connected to FRPCM 204 via line 219. Finally, to complete the hierarchical system, the loads 221 are connected to FRPCMs 203 and 204 via lines 223 and 225, respectively.

As stated above, the hierarchical power system of FIG. 1 using prior art ELMCs required seven ELMCs of five different designs. FIG. 3 demonstrates that by using the present invention, the same power system can be achieved using only four FRPCMs of one design, resulting in significant savings in system cost and a reduction in system weight and complexity. Furthermore, all four amp increments from 4 to 96 amps would be available for each FRPCM 201–204 in FIG. 3. Thus, the FRPCM of the present invention provides more flexibility than prior art ELMCs to accommodate possible future system changes.

Figure 4:
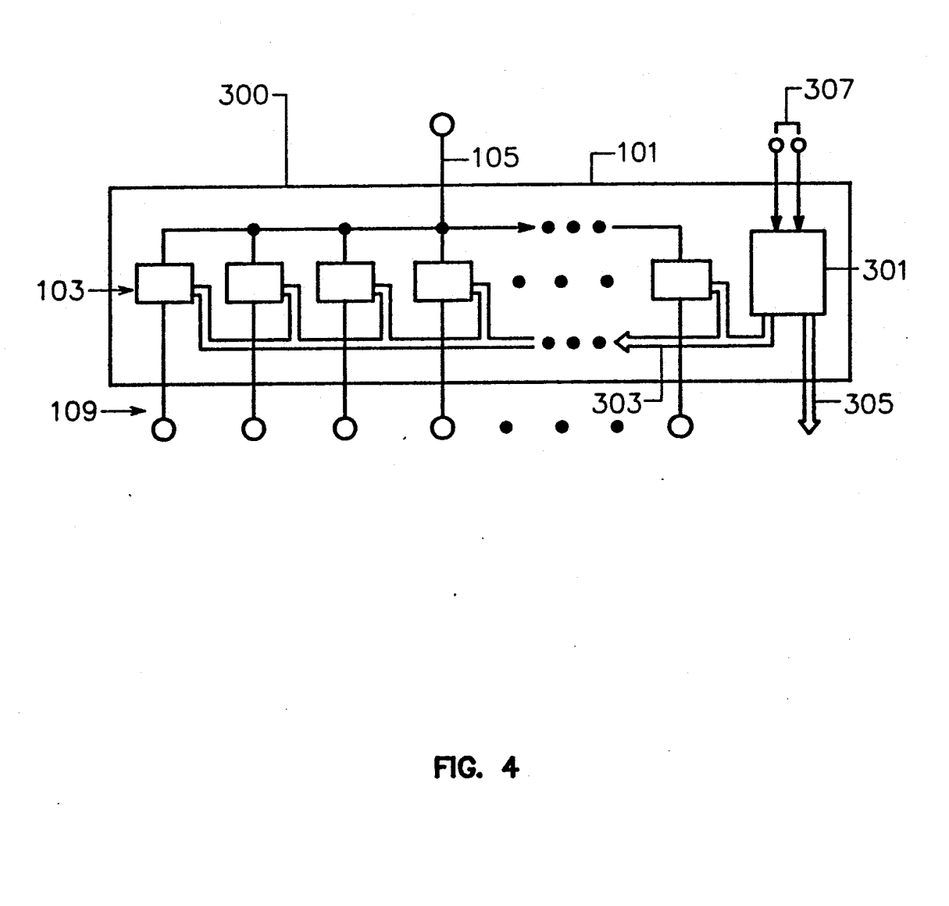
FIG. 4 illustrates another embodiment of the flexible remote power controller module of the present invention including control and monitoring circuitry.

FIG. 4 illustrates another embodiment of the FRPCM of the present invention. The FRPCM 300 of FIG. 4 contains the same components as the FRPCM 100 shown in FIG. 2 but additionally contains control and monitoring circuitry 301, a control and monitoring bus 303, an external interface 305, and a configuration connector 307. As will be discussed more fully below in reference to FIGS. 6 and 7, each of the current limiting channels 103 contains control logic which trips a current limit switch after a time period of current flow at the channel current limit level. The control and monitoring circuitry 301 monitors the trip status of each of current limiting channels 103 via the control and monitoring bus 303. When one of the channels 103 has tripped, the control and monitoring circuitry 301 then trips via control and monitoring bus 303 each of the channels 103 that has been paralleled to the tripped channel. This simultaneous tripping of all paralleled switch channels 103 by the control and monitoring circuitry 301 is desirable because it allows a smoother shut-off of the appropriate portion of the power distribution system. The control and monitoring circuitry 301 also may reset the tripped current limiting channels 103 via the control and monitoring bus 303. The control and monitoring circuitry 301 may accept jumper inputs (not shown) from the configuration connector 307 which indicate to the control and monitoring circuitry 301 which current limiting channels 103 are connected in parallel and thus which current limiting channels 103 to trip. In another embodiment, the switch channel paralleling information may be stored in an external computer or microprocessor (not shown) and may be communicated to the control and monitoring circuitry 301 via external interface 305. The external interface 305 may be a high speed data bus or some other communication link. In a still further embodiment, the current limiting channel 103 trip status monitoring and control may be performed by an external computer and communicated to the FRPCM 300 via the external interface 305, while the current limiting channel 103 paralleling information may be communicated to the FRPCM 300 via the configuration connector 307. In yet another embodiment, the current limiting channel 103 trip status monitoring and control may be performed by an external computer that also stores the current limiting channel 103 paralleling information. The parallel control of the current limiting channels 103 may also be performed via external interface 305 by external program control. The control and monitoring circuitry 301 may be hardwired toggle switches and visual indicators (not shown) such as Light Emitting Diodes (LEDs) or may be provided by, for example, a dual redundant MIL-STD-1553B Remote Terminal. Such a Remote Terminal may interface to an external computer and accept data for translation via logic into control signals to be sent to the current limiting channels. The control and monitoring circuitry 301 may also be a microprocessor.

Figure 5:
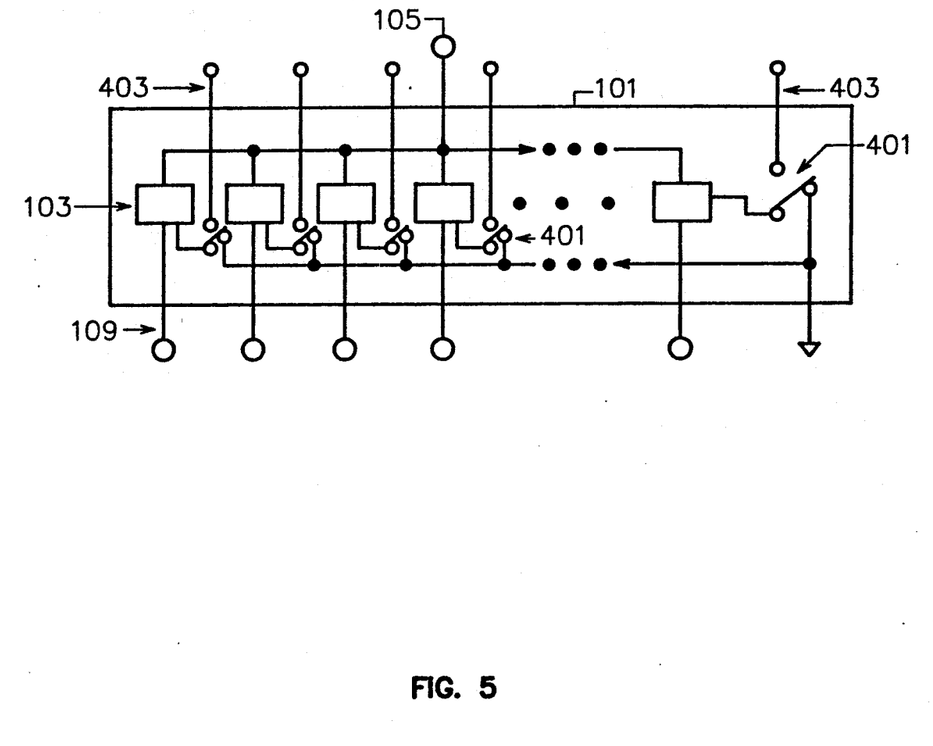
FIG. 5 illustrates another embodiment of the flexible remote power controller module of the present invention including toggle switches.

While the simultaneous tripping of the paralleled current limiting channels 103 by the control and monitoring circuitry 301 is desirable, it is not necessary. When a number of current limiting channels are paralleled and one of them trips, the others will also automatically trip because they will be unable to absorb and pass the excess current without reaching their respective current limit levels. Further, they will all sense the same voltage drop across their respective current limit switches and will respond similarly. FIG. 5 illustrates another embodiment of the present invention wherein toggle switches 401 are used to disable or enable the paralleled current limiting channels 103 via switch input lines 403. Signals controlling the switches 401 may be generated by an external computer or by buttons on the FRPCM units.

Figure 6:
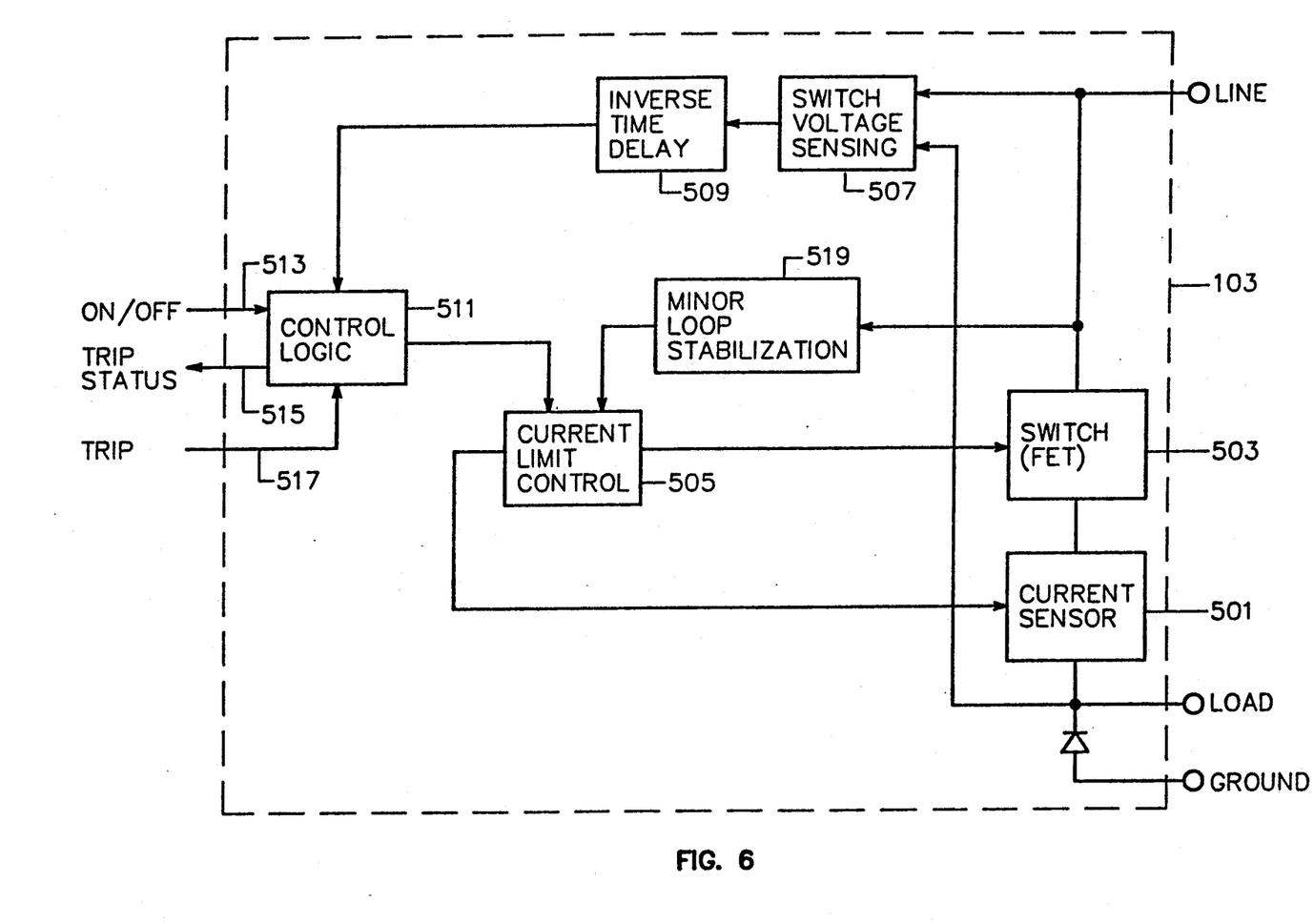
FIG. 6 is a block diagram illustrating an exemplary embodiment of the function of the current limiting channels within the flexible remote power controller module of the present invention.

FIG. 6 illustrates a functional block diagram of one embodiment of the circuitry found within the current limiting channels 103 of the present invention. Block 501 represents a current sensor that monitors the current flowing through the Field Effect Transistor (FET) switch in block 503. As the current increases, the current sensor in block 501 attempts to limit the current to the current limit level by causing the current limit control in block 505 to drive the FET current limit switch in block 503 into the linear region. During the current limit mode, i.e., when the FET current limit switch in block 503 is driven into the linear region, the FET switch voltage drop increases. The switch voltage sensing circuitry in block 507 monitors the FET switch voltage drop, and once a threshold voltage is reached, the switch voltage sensing circuitry causes the circuitry of block 509 to initiate an inverse time delay. If at the end of the time delay the voltage drop across the FET current limit switch in block 503 is still at or above the threshold, the control logic in block 511 causes the current limit control in block 505 to trip the FET current limit switch in block 503. The control logic block 511 may also take external logic via the ON/OFF line 513 and the TRIP line 517 as explained above with regard to the trip and reset functions of the monitoring and control circuitry 301 of FIG. 4. The control logic block 511 further may initiate a TRIP STATUS signal via line 515 for external monitoring by, for example, the monitoring and control circuitry 301 of FIG. 4. Block 519 represents stabilization circuitry that prevents instability in the current limit control of block 505 caused by highly inductive loads. The combination of the current sensing performed at block 501 and the switch voltage sensing at block 507 forces the paralleled current limiting channels 103 of the system to share current during current limit conditions. In other words, before tripping their respective current limit switches, the paralleled current limiting channels constantly attempt to reach a current flow equilibrium. This equilibrium is dependent upon the ratio of the respective current limits of the current limiting channels.

Figure 7:
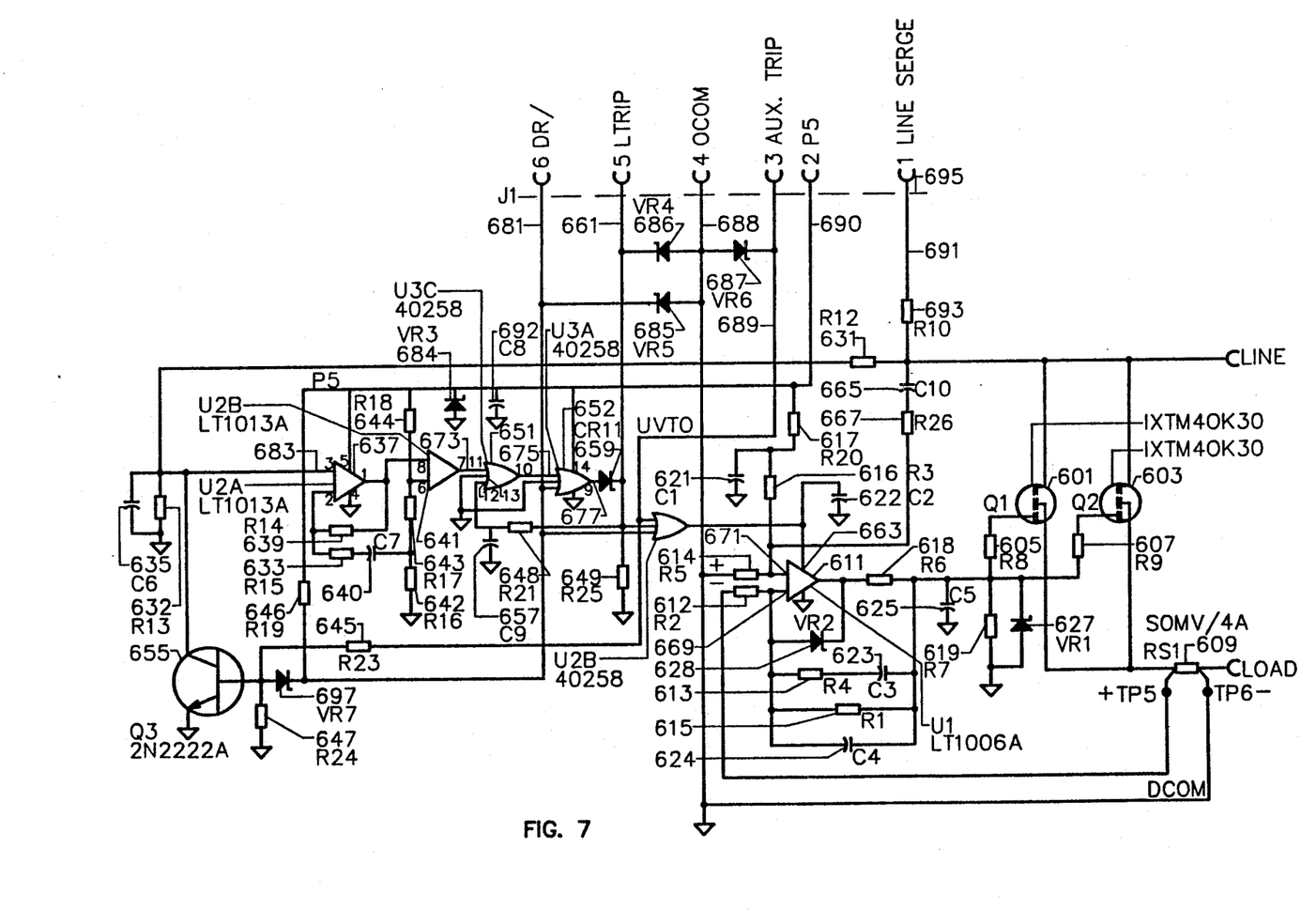
FIG. 7 is a circuit diagram illustrating an exemplary embodiment of the current limiting channels within the flexible remote power controller of the present invention.

FIG. 7 illustrates a more detailed description of one embodiment of the circuitry of the current limiting channels 103 of the present invention. Field Effect Transistors 601 and 603 and associated resistors 605 and 607 perform the switch function of block 503 of FIG. 6, while resistor 609 performs the current sensing function of block 501 of FIG. 6. Operational amplifier (Op Amp) 611 and associated resistors 611–619, capacitors 621–625, and zenor diodes 627 and 628 perform the function of the current limit control block 505 of FIG. 6. Together, resistor 609, op amp 611, FETs 601 and 603, and their associated components form a current limit control loop. Resistor 609 senses the current across FETs 601 and 603. Once that current reaches a threshold level, dictated by resistors 614, 616, and 617, the op amp 611 begins to clamp FETs 601 and 603, i.e., drives FETs 601 and 603 into the linear region.

Resistors 631–633, capacitor 635, and op amp 637 perform the voltage sensing function of block 507 in FIG. 6 while resistor 639, capacitor 640, and op amp 637 perform the inverse time delay function of block 509 in FIG. 6. Resistors 631–632 and capacitor 635 form a voltage divider placing the voltage across the FETs 601 and 603 on the input 683 of op amp 637. If that voltage reaches a threshold level, set by resistors 642–644, the op amp 637 initiates an inverse time delay through capacitor 640 and resistor 639. If at the end of the time delay the voltage across the FETs 601 and 603 has not dropped below the threshold level, the output 673 of op amp 641 is driven high. Op amp 641, resistors 642–649, nor gates 651–653, capacitor 657, and diode 659 perform the function of the control logic block 511 of FIG. 6. The driving of output 673 of op amp 641 high drives output 675 of nor gate 651 low which in turn drives the output 677 of nor gate 652 high. This drives the output 679 of nor gate 653 low which turns off the power pin 663 of op amp 611. As a result, FETs 601 and 603 are tripped and the current limiting channel is disabled. Diode 659 permits via line 661 external circuitry (not shown) to trip the FETs of paralleled current limiting channels (also not shown) as described above with regard to FIG. 4. Line 661 further permits the external circuitry (i.e. the control and monitoring circuitry of FIG. 4) to trip the FETs 601 and 603 via nor gate 653 and op amp 611.

Line 681 is an ON/OFF line which is activated externally to the current limiting channel, for example, manually via the toggle switch 401 of FIG. 5 or via the control and monitoring circuitry 301 of FIG. 4. After a fault, a low signal on line 681 is unable to directly turn on the op amp 611 via nor gate 653 (and thus close the switch FETs 601 and 603) because the control logic, i.e., nor gates 651–653 latch the trip signal. A low signal on line 681 turns on transistor 655 which pulls the voltage at input 683 of op amp 637 to ground, resetting the output 673 of op amp 641. Once the channel is commanded on by a low state on line 681, transistor 655 is shut off and the voltage across FETs 601 and 603 is again placed at input 683 of op amp 637. Thus, op amps 637 and 641 are reset when a high signal is exerted on line 681 and enabled by exerting a low signal on line 681.

The feedback loop comprising capacitor 665 and resistor 667 performs the function of the minor loop stabilization block 519 of FIG. 6. Capacitor 665 and resistor 667 were added to provide stability when an inductive load current would prove too sluggish for smooth current limit control. Such stability is especially desirable in aerospace type power systems where there is a need to drive inductive loads such as actuators and small motors. It should be noted that the capacity to handle load inductances can be improved in the circuit of FIG. 7 by adding a second pole network in the voltage feedback circuit or by using an active feedback circuit in place of capacitor 665 and resistor 667.

Because transient performance becomes more critical when paralleling the current limiting channels of the present invention, zener diode 628 is added to the circuit of FIG. 7 to improve the transient response of the current limit control loop, i.e., blocks 501, 503, and 505 of FIG. 6, by reducing the overdrive to FETs 601 and 603 and allowing a faster control loop response. A second zener diode 627 clamps the gate voltage of FETs 601 and 603 to limit peak shoot through currents which occur during fault applications to an FRPCM in the "on" state.

Logic control of the current limiting channel is simplified by the use of a low power operational amplifier for op amp 611, which allows the CMOS logic control (i.e., nor gates 651-653) to switch the power pin 663 of op amp 611. Normally, the on/off control would have to disable the current feedback signal (pin 669 of op amp 611) and the current limit reference circuit signal (pin 671 of op amp 611). By switching the power pin 663 of op amp 611, only a single on/off control signal is needed. Additionally, soft start - soft stop (often desirable in high voltage dc power systems) is accomplished by resistor 618 and capacitor 625, allowing the on/off control scheme to be used.

Zener diodes 684-687 may be used to protect the circuit from spikes on the signal lines 681, 661, and 688-690. Further, capacitor 621, 622 and 692 may be used to filter out noise generated in the power source signal line 690 due to the switching of load currents. Resistor 693 may be used for current limiting on signal line 691.

Line 691 acts as a line sense and can be used to externally monitor the line voltage. Signal line 689 is an auxiliary trip signal which may come from the control and monitoring circuitry 301 of FIG. 4 and be used, for example, to initiate an under-voltage trip or an over temperature trip of the FETs 601 and 603. This auxiliary trip signal on line 689 is not latched and only lasts as long as the relevant situation exists. Dotted line 695 represents a standard ribbon cable connector for connection of signal lines 661, 681, and 688-691.

The following table illustrates a possible list of the components of FIG. 7 and their respective values, if any:

| LABEL | SYMBOL | DESCR. | SCHEMATIC | ELEC./DES. | |
|---|---|---|---|---|---|
| 621 | C 1 | Capacitor | 0.1 UF | 100 V | 10 |
| 622 | C 2 | Capacitor | .068 UF | 50 V | 10 |
| 623 | C 3 | Capacitor | 4700 PF | 100 V | 10 |
| 624 | C 4 | Capacitor | .022 UF | 50 V | 10 |
| 625 | C 5 | Capacitor | .1 UF | 50 V | 10 |
| 635 | C 6 | Capacitor | 1000 PF | 200 V | 10 |
| 640 | C 7 | Capacitor | .47 UF | 50 V | 10 |
| 692 | C 8 | Capacitor | .1 UF | 50 V | 10 |
| 657 | C 9 | Capacitor | .1 UF | 50 V | 10 |
| 665 | C10 | Capacitor | 100 PF | 200 V | 10 |
| 659 | CR11 | Diode | 1N4 148-1 | 100 V .200 A | A297A |
| 695 | J 1 | DuPont Male Connector | Right Angle | | |
| 601 | Q 1 | Field Effect Trans | 1 XYS | 40 A, 300 V | |
| 603 | Q 2 | Field Effect Trans | 1 XYS | 40 A, 300 V | |
| 655 | Q 3 | Transistor | 2N2222A | 40 V | 0.8 A |
| 615 | R 1 | Resistor | 200K | .050W W | T.1 |
| 612 | R 2 | Resistor | 100 OHM | 0.05 W | .1 |
| 616 | R 3 | Resistor | 7.5K | 0.05 W | .1 |
| 613 | R 4 | Resistor | 20K | .125 W | T2 |
| 614 | R 5 | Resistor | 100 OHM | 0.05 W | .1 |
| 618 | R 6 | Resistor | 330 | .125 W | T2 |
| 619 | R 7 | Resistor | 4.7K | .125 W | T2 |
| 605 | R 8 | Resistor | 15 | .125 W | T2 |
| 607 | R 9 | Resistor | 20K | .125 W | T2 |
| 693 | R 10 | Resistor | 20K | .125 W | T2 |
| 631 | R 12 | Resistor | 2.0M | 0.05 W | .1 |
| 632 | R 13 | Resistor | 51.1K | 0.05 W | .1 |
| 639 | R 14 | Resistor | 6.04K | .050 W | T1 |
| 633 | R 15 | Resistor | 30.1K | .050 W | T1 |
| 642 | R 16 | Resistor | 51.1 OHM | 0.05 W | .1 |
| 643 | R 17 | Resistor | 4.99K | .050 W | T.1 |
| 644 | R 18 | Resistor | 4.99K | .050 W | T.1 |
| 646 | R 19 | Resistor | 10K | .125 W | T2 |
| 617 | R 20 | Resistor | 20.0K | 0.05 W | .1 |
| 648 | R 21 | Resistor | 330 | .125 W | T2 |
| 645 | R 23 | Resistor | 100K | .125 W | T2 |
| 647 | R 24 | Resistor | 100K | .125 W | T2 |
| 649 | R 25 | Resistor | 150K | .125 W | T2 |
| 667 | R 26 | Resistor | 470.0K | .125 W | T2 |
| 609 | RS 1 | Current Shunt | | 50 MV/4 | A |
| | TP 5 | Terminal Post | | | |
| | TP 6 | Terminal Post | | | |
| 611 | U 1 | LIN OPAMP (single) | | | |
| 637 & 641 | U 2 | LIN OPAMP (dual) | | | |
| 651-653 | U 3 | CMOS | 4025 | Triple | 3 Input |
| 627 | VR 1 | Diode, Zener, | 1N827 | 6.2 V | .40 W |

| LABEL | SYMBOL | DESCR. | SCHEMATIC | ELEC./DES. | |
|---|---|---|---|---|---|
| 628 | VR 2 | Tempcomp Diode, Zener, | 1N827 | 6.2 V | .40 W |
| 684 | VR 3 | Tempcomp Diode, Zener | 1N967B-1 | 18 V | 1.5 W |
| 686 | VR 4 | Diode, Zener | 1N965B-1 | 15.0 V | .40 W |
| 685 | VR 5 | Diode, Zener | 1N965B-1 | 15.0 V | .40 W |
| 687 | VR 6 | Diode, Zener | 1N965B-1 | 15.0 V | .40 W |
| 697 | VR 7 | Diode, Zener | DZ721214J | 12.0 V | .40 W |

Figure 8A:
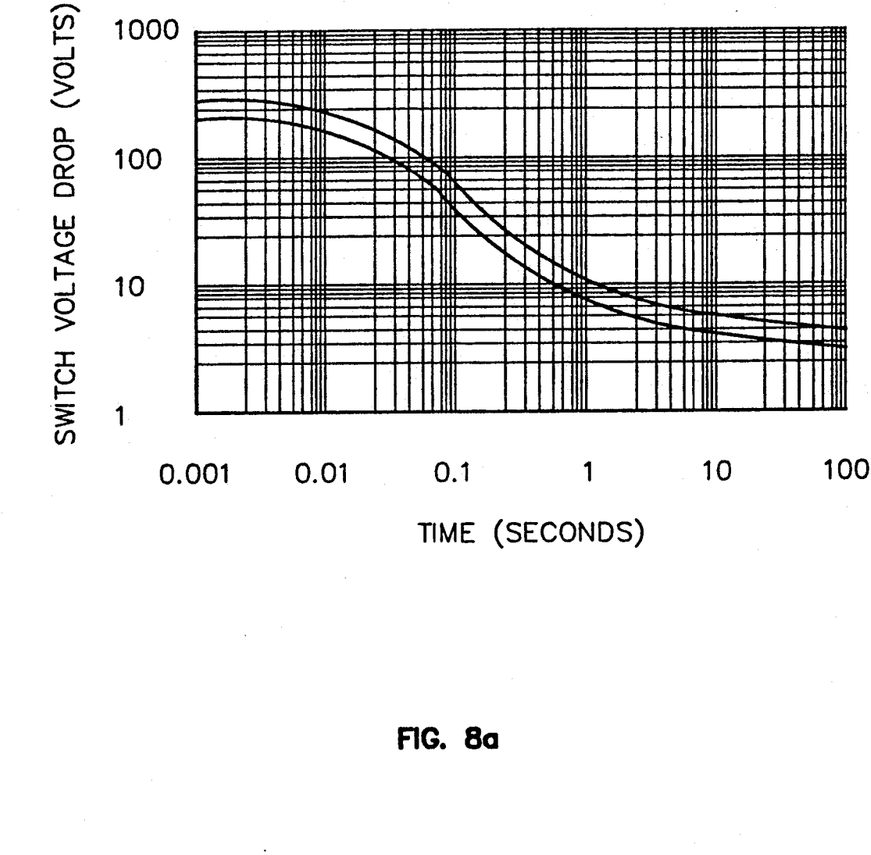
FIGS. 8a and 8b illustrate a graph illustrating the switch voltage drop versus trip time curve used for the current limiting channel circuitry of FIG. 7.
Figure 8B:
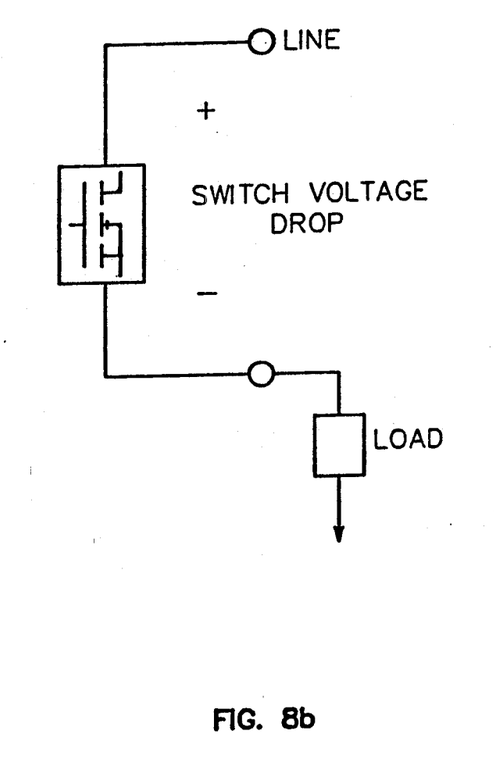

FIGS. 8a and 8b illustrates the switch drop versus trip time curve used for the current limiting channel circuitry of FIG. 7. A major concern in hierarchical power systems is selective tripping of faulted buses or loads to maintain the highest possible level of power integrity on the remainder of the system. In order to allow selective tripping with one FRPCM design, each current limiting channel of the FRPCM is based on a switch design that contains an inverse time delay (e.g., op amp 637, resistor 639, and capacitor 640 in FIG. 7) as opposed to prior art fixed time delays.

Many modifications and variations of the present invention are possible in light of the above teachings. Thus, it is to be understood that, within the scope of the appended claims, the invention may be practiced otherwise than as described hereinabove.

I claim:

1. In a power distribution system, a power controller module for preventing excessive current flow between a power source and a load, said power controller module comprising:
   a plurality of current limiting channels each having a predetermined current flow limit;
   each of said plurality of current limiting channels comprising an input line, an output line, and a current limit switch connected between the input and output lines;
   said current limit switch allowing current to flow between said input line and said output line when current flow through the respective current limiting channel is below said predetermined current flow limit and limiting current flow between said input line and said output line when said current flow through the respective current limiting channel exceeds said predetermined current flow limit; and
   said plurality of current limiting channels being selectively interconnectable in parallel with one another to form one or more current pathways, each of said current pathways having a current flow limit corresponding to the sum of the predetermined current flow limits of the respective current limiting channels that are connected in parallel to form the respective current pathway.

2. The power distribution system of claim 1 wherein said power controller module further comprises means for disrupting current flow through each of said plurality of current limiting channels forming said current pathway in response to disruption of the current flow through any one of said plurality of current channels forming said current pathway.

3. The power distribution system of claim 1 wherein said plurality of current limiting channels of said power controller module have the same predetermined current flow limit such that said one or more current pathways provide current flow limits that are integer multiples of said predetermined current flow limit.

4. The power distribution system of claim 1 wherein each of said plurality of current limiting channels of said power controller module further comprises evaluation means for determining whether current flow through said current limiting channel exceeds said predetermined current flow limit so that the current limit switch of the current limiting channel enables or limits current flow through the current limiting channel in response to the evaluation means.

5. The power distribution system of claim 4 wherein said power controller module further comprises auxiliary means for disrupting current flow through one or more of said plurality of current limiting channels independent of said evaluation means.

6. A power distribution system as claimed in claim 4 wherein said evaluation means controls the enabling and limiting of said switch in response to monitored current flow through said switch.

7. A power distribution system as claimed in claim 4 wherein said evaluation means controls the enabling and limiting of said switch in response to monitored current flow through said switch and in response to a voltage drop across said switch.

8. A power distribution system as claimed in claim 7 wherein said switch is an FET and said evaluation means drives said FET into a linear region in response to current flow approaching substantially close to said predetermined current flow limit thereby causing said voltage drop across said switch to exceed a predetermined voltage level and initiating a timing sequence in said evaluation means.

9. A power distribution system as claimed in claim 8 wherein said evaluation means controls said switch to disrupt current flow therethrough if said voltage drop across said switch exceeds said predetermined voltage level for a predetermined period of time.

10. A power distribution system as claimed in claim 1 wherein said predetermined period of time is inversely proportional to the level of said voltage drop across said FET switch.

11. A power distribution system as claimed in claim 1 wherein current flow through said current limiting channel is completely disrupted if said current flow through said current limiting channel exceeds said predetermined current flow limit for a predetermined period of time.

12. A power distribution system as claimed in claim 11 wherein said predetermined period of time is inversely proportional to the level of said current flow through said current limiting channel.

13. In a power distribution system, a power controller module for preventing excessive current flow between a power source and a load, said power controller module comprising a plurality of current limiting channels, each of said plurality of current limiting channels having a predetermined current flow limit, said plurality of current limiting channels being selectively interconnectable in parallel with one another to form one or more current pathways, each of said current pathways having a current flow limit corresponding to the sum of the predetermined current flow limits of the respective current limiting channels that are connected in parallel to form the respective current pathway, each of said plurality of current limiting channels comprising:

evaluation means for determining whether current flow through said current limiting channel exceeds said predetermined current flow limit;

a switch connected between the power source and the load which enables or limits current flow through said current limiting channel in response to the evaluation means, said switch responsive to said evaluation means to allow current to flow through said current limiting channel when current flow through said current limiting channel is below said predetermined current flow limit and responsive to limit current flow through said switch when said current flow through said current limiting channel exceeds said predetermined current flow limit; and each of said plurality of current limiting channels that are connected in parallel passing only a portion of the total current flowing through the respective current pathway.

14. The power distribution system of claim 13 wherein said evaluation means of each of said plurality of current limiting channels of the remote power controller module evaluates current flow through said switch.

15. The power distribution system of claim 13 wherein said evaluation means of each of said plurality of current limiting channels of the power controller module evaluates current flow through and voltage drop across said switch.

16. A power distribution system as claimed in claim 13 wherein current flow through said current limiting channel is completely disrupted if said current flow through said current limiting channel exceeds said predetermined current flow limit for a predetermined period of time.

17. A power distribution system as claimed in claim 16 wherein said predetermined period of time is inversely proportional to the level of said current flow through said current limiting channel.

18. In a power distribution system, a power controller module for preventing excessive current flow between a power source and a load, said power controller module comprising a plurality of current limiting channels, each of said plurality of current limiting channels having a predetermined current flow limit, said plurality of current limiting channels being selectively interconnectable in parallel with one another to form one or more current pathways, each of said current pathways having a current flow limit corresponding to the sum of the predetermined current flow limits of the respective current limiting channels that are connected in parallel to form the respective current pathway, each of said plurality of current limiting channels comprising:

evaluation means for determining whether current flow through said current limiting channel exceeds said predetermined current flow limit;

a switch connected between the power source and the load which enables or limits current flow through said current limiting channel in response to the evaluation means, said switch responsive to said evaluation means to allow current to flow through said current limiting channel when current flow through said current limiting channel is below said predetermined current flow limit and responsive to limit current flow through said current limiting channel when said current flow through said current limiting channel exceeds said predetermined current flow limit;

a signal path for permitting said switch to disrupt current flow through the current limiting channel independently of said evaluation means; and each of said plurality of current limiting channels passing only a portion of the total current flowing through the respective current pathway.

19. A power distribution system as claimed in claim 18 wherein current flow through said current limiting channel is completely disrupted if said current flow through said current limiting channel exceeds said predetermined current flow limit for a predetermined period of time.

20. A power distribution system as claimed in claim 19 wherein said predetermined period of time is inversely proportional to the level of said current flow through said current limiting channel.

21. In a power distribution system, a power controller module for preventing excessive current flow between a power source and a load, said power controller module comprising:

a plurality of current limiting channels each having a predetermined current flow limit;

each of said plurality of current limiting channels comprising an input line, and output line, evaluation means for determining whether current flow through said current limiting channel exceeds said predetermined current flow limit, and a switch which enables or limits current flow between said input line and said output line of the current limiting channel in response to the evaluation means, said switch responsive to allow current to flow through said current limiting channel when current flow through said current limiting channel is below said predetermined current flow limit and responsive to limit current flow through said current limiting channel when said current flow through said current limiting channel exceeds said predetermined current flow limit;

said plurality of current limiting channels being selectively interconnectable in parallel with one another to form one or more current pathways, each of said current pathways having a current flow limit corresponding to the sum of the predetermined current flow limits of the respective current limiting channels that are connected in parallel to form the respective current pathway; and auxiliary means for causing the switch of each of said plurality of current limiting channels to disrupt current flow through said current limiting channel independently of said evaluation means.

22. The power distribution system of claim 21 wherein said auxiliary means of said power controller module comprises a plurality of hard wired toggle switches.

23. The power distribution system of claim 21 wherein said auxiliary means of said power controller module comprises processor means communicative with each of the plurality of current limiting channels.

24. The power distribution system of claim 21 wherein said auxiliary means of said power controller module is capable of activating the evaluation means of each of said plurality of current limiting channels.

25. The power distribution system of claim 24 wherein said auxiliary means of said power controller module comprises a plurality of hard wired toggle switches.

26. The power distribution system of claim 24 wherein said auxiliary means of said power controller module comprises a processor means communicative with each of the plurality of current limiting channels.

27. A power distribution system as claimed in claim 21 wherein current flow through said current limiting channel is completely disrupted if said current flow through said current limiting channel exceeds said predetermined current flow limit for a predetermined period of time.

28. A power distribution system as claimed in claim 27 wherein said predetermined period of time is inversely proportional to the level of said current flow through said current limiting channel.

29. In a power distribution system, a power controller module for preventing excessive current flow between a power source and a load, said power controller module comprising:
  a plurality of current limiting channels each having a predetermined current flow limit;
  said plurality of current limiting channels being selectively interconnectable in parallel with one another to form one or more current pathways, each of said current pathways having a current flow limit corresponding to the sum of the predetermined current flow limits of the respective current limiting channels that are connected in parallel to form the respective current pathway; and
  means for urging current limiting channels that are connected in parallel to share current generally equally.

30. A power distribution system as claimed in claim 29 wherein said means for urging comprises limiting means respectively associated with each of said current limiting channels for limiting current through the respective current limiting channel in response to current flow through said current limiting channel exceeding said predetermined current flow limit thereby to distribute current to other current limiting channels connected in parallel with said respective current limiting channel.

31. A power distribution system as claimed in claim 30 wherein current flow through said current limiting channel is completely disrupted if said current flow through said current limiting channel exceeds said predetermined current flow limit for a predetermined period of time.

32. A power distribution system as claimed in claim 31 wherein said predetermined period of time is inversely proportional to the level of said current flow through said current limiting channel.

* * * * *